May 11, 1965        L. B. RONK        3,183,362
ELECTRIC SERVICE SYSTEM

Filed April 25, 1961        2 Sheets-Sheet 1

May 11, 1965

L. B. RONK 3,183,362

ELECTRIC SERVICE SYSTEM

Filed April 25, 1961

2 Sheets-Sheet 2

__United States Patent Office__

3,183,362
Patented May 11, 1965

3,183,362
ELECTRIC SERVICE SYSTEM
Leroy B. Ronk, Nokomis, Ill., assignor to System Analyzer Corp., Nokomis, Ill., a corporation of Wisconsin
Filed Apr. 25, 1961, Ser. No. 105,497
7 Claims. (Cl. 307—38)

This invention relates to electric service systems, and more particularly to farmstead or rural electric service systems.

Among the several objects of the invention may be noted the provision of electric service systems of the class described which permit a permanent and economical uprating or increase in existing customer power services or provide an inexpensive new installation of heavy duty service; the provision of service equipment for such systems which prevents the cold load pick-up requirements of the power distribution system of which it is a part from exceeding the diversity factor of the system; the provision of electric service systems in which both the transformers and the customers' services are protected from overloads, reduced line voltage, and short circuits; the provision of electric service systems of the class described which permits the increase of uprating of the customer's power service without replacing the existing meter and without installing conventional meter loops; and the provision of service equipment for such systems which provides safe, quick and convenient means for disconnecting service and resetting the main or control breaker. Other objects and features will be in part apparent and in part pointed out hereinafter.

The invention accordingly comprises the constructions hereinafter described, the scope of the invention being indicated in the following claims.

Figure 1:
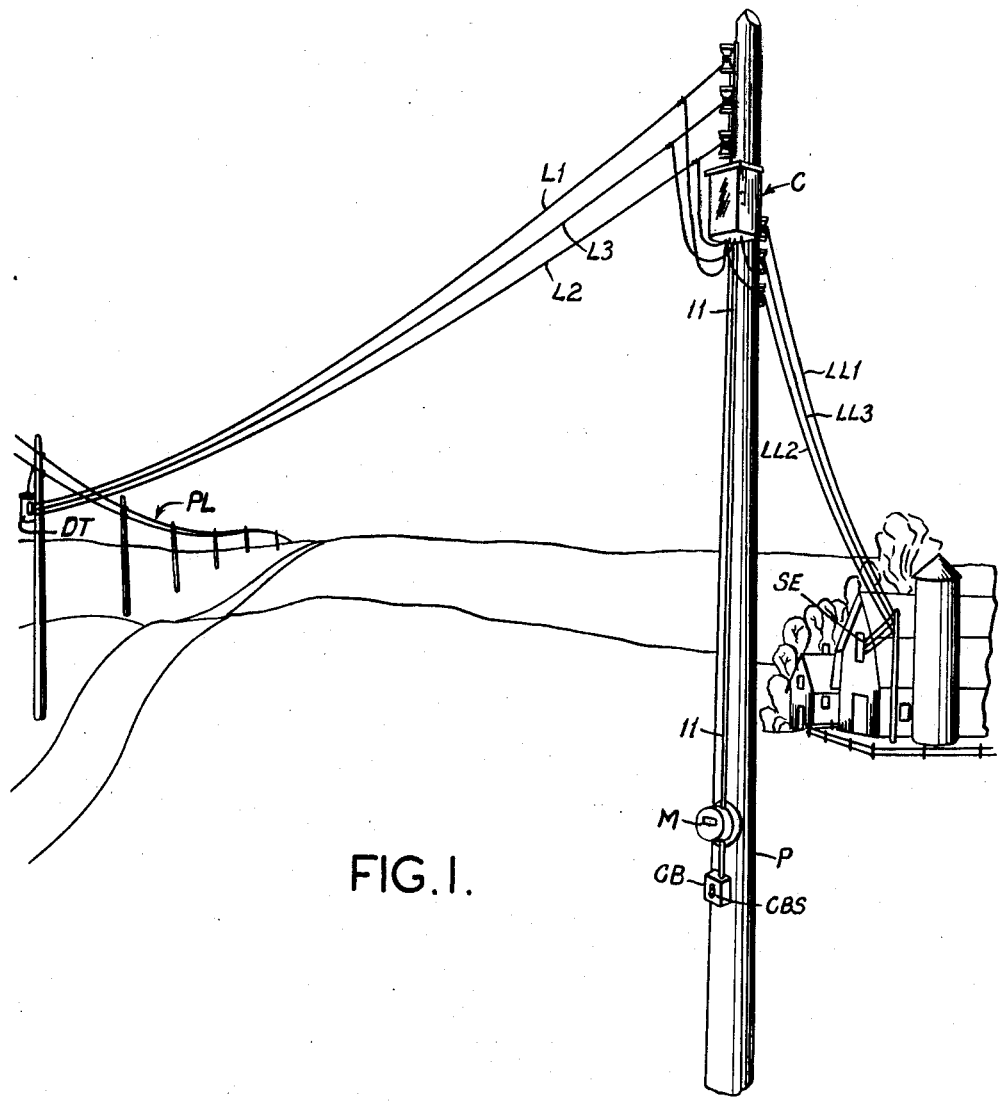
Figure 2:
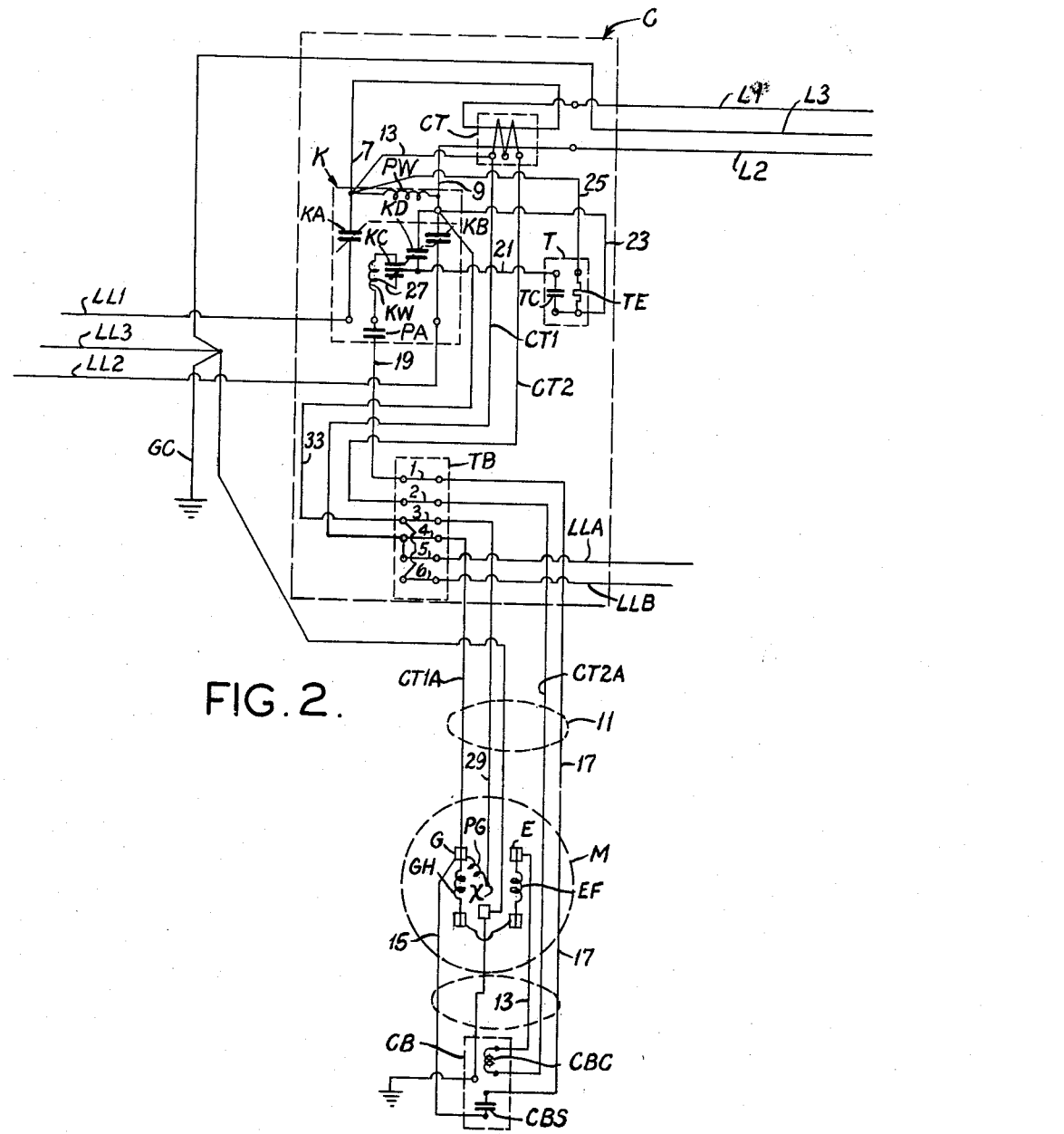

In the accompanying drawings, in which one of various possible embodiments of the invention is illustrated, FIG. 1 is an isometric view of an electric service system incorporating service equipment of the present invention; and FIG. 2 is a circuit diagram of the system and equipment illustrated in FIG. 1.

Corresponding reference characters indicate corresponding parts throughout the several views of the drawings.

It is frequently necessary to uprate or increase the existing electric service of farmsteads or rural electric service installations as heavy duty electrical units and appliances are installed by the farmer. For example, if the present service is rated at 100 amperes and the service must be uprated to 200, 300 or 400 amperes, it has been customary to install expensive high conductivity cables from the top of the pole to which the service drop is usually connected to a new higher-rated meter in a meter loop. When the next occasion arises for increasing the rated capacity of the service the same procedure must be followed with the attendant additional substantial expense.

In accordance with the present invention, the expense of installing a meter loop and the various disadvantages thereof are eliminated. No high-amperage expensive cables are carried down the pole, but instead low-current economical conductors are extended to the existing meter and a safe low-amperage control breaker for opening a contactor located near the pole top is provided at a convenient easty-to-reach location near ground level. The service equipment of this invention also provides overload and short-circuit protection for both the distribution transformer supplying the service drop as well as the customer's service. Moreover the novel integral service equipment described hereinafter prevents applying to the distribution system a load in excess of the diversity factor (which is the percentage of the connected load that the distribution system is designed to handle, and is usually about 50%), when there has been a power failure or outage.

Referring now more particularly to the drawings, an exemplary farmstead electric service system is illustrated in FIG. 1. A high voltage power distribution line which is part of a conventional rural electric distribution system is indicated at PL. A pole-hung distribution transformer DT has its high voltage bushing connected to PL and its low voltage bushings connected to the customary farmstead service drop constituted by service drop conductors L1, L2 and L3, the latter being the neutral or grounded conductor of the typical three-wire, single-phase supply. Conductors L1, L2 and L3 are dead-ended at the top of a typical yard or service pole P, and short service entrance conductors constituting the ends of L1, L2 and L3 are terminated at a cabinet C. L1 and L2 are connected respectively to contacts KA and KB of an electrical contactor K via two leads 7 and 9 which pass through the window of a current transformer CT, and constitute the primary thereof. L3 is terminated at the usual grounding cable GC. Current transformer CT is of conventional design and is essentially a toroidal coil through which conductors L1 and L2 are threaded in reverse directions (as indicated in FIG. 2), so that the current transformer senses the magnitude of the total current carried by the two hot line conductors L1 and L2. Contacts KA and KB are serially connected between L1, L2 and a set of feeder conductors LL1, LL2 which function to supply metered electrical power to service entrances, such as SE, and distribution panels at various farm buildings, LL3 being the grounded neutral.

The two terminals of CT are connected to two terminals 4 and 2 of a barrier strip type terminal block TB (mounted within enclosure C) by means of current transformer leads CT1 and CT2. Continuity with these leads CT1 and CT2 is established between a conventional electric watt hour type meter M, a control breaker CB (both mounted below enclosure cabinet C and near the bottom of the pole P), and terminals 2 and 4 by means of two conductors CT1A and CT2A of an insulated five-conductor cable 11. Thus a series loop circuit is established between current transformer CT via CT1, CT1A, two current coil elements GH and EF of meter M, a wire 13, an overload current responsive coil CBC of control breaker CB, and CT2A. The current traversing this loop circuit is a fixed proportion of the total load current supplied by service drop conductors L1, L2 and L3, for example in the order of 1 to 5 amperes, as a proportion of the load current of a 200, 300 or 400 ampere service.

Control breaker CB also includes a control switch CBS which is both manually operable to open or reclose contacts KA and KB of the heavy duty contactor K and automatically operable in response to a current flowing in CBC which is in excess of a preset level corresponding to a fixed proportion of the maximum load current that can safely be drawn from conductors L1, L2 and L3. The contacts of switch CBS are series-connected in a circuit including an actuating winding KW of contactor K, contacts TC of the switch element of a thermally actuated time-delay cut-out device T, and contacts PA of a potential relay having its winding PW connected across wires 7 and 9. All of these components are mounted in cabinet C. More specifically, this circuit includes a wire 13 commonly connected to one terminal of transformer CT and L1, conductor CT1, terminal 4 of TB, conductor CT1A, a lead 15, switch contacts CBS, a wire 17, terminal 1 of TB, a wire 19, contacts PA, winding KW, contacts KC (double-throw, single-pole), a wire 21, contacts TC, and a wire 23 which interconnects TC to L2.

The time-delay circuit T includes a thermal component TE connected by leads 23 and 25 directly across L1 and L2 which is preferably of the dual bi-metallic strip type and which is directly or indirectly heated as long as L1 and L2 are supplying electrical power to contactor K. The dual strips compensate for any ambient temperature variations and the contacts TC therefore are normally closed when L1 and L2 are energized. Cutout T has a thermal mass or inertia, however, so that upon a power failure or outage deenergizing L1 and L2, contacts TC will not immediately open, but will open only after a predetermined delay, e.g., two to three minutes, the time required for T to cool sufficiently. This predetermined delay period may be varied as desired, for example by adjusting the spacing between contacts TC so that a greater or lesser predetermined delay of reopening can be set.

Contactor K includes a fourth set of contacts KD shunt-connected across thermal delay cutout switch contacts TC by wires 21 and 23. All four sets of cutouts KA, KB, KC and KD are ganged together for common actuation by winding KW of contactor K. Main contacts KA and KB, when closed, function to interconnect power from L1, L2, L3, to LL1, LL2, LL3, and operate to break this circuit when KW is deenergized. The single-pole double-throw set of contacts KC functions to interconnect initially an intermediate tap of winding KW by means of a wire 27 in the series actuating circuit for winding KW. That is, when winding KW of contactor K is deenergized, wire 21 is connected via the normally closed portion of contacts KC to the intermediate tap of KW, and when this circuit is initially energized (e.g., by closing of CBS or TC) only the lower portion of KW is energized. After actuation of K, the lower portion of KC opens and the upper portion closes, thereby connecting the entire winding KW in the series actuating circuit of contactor K, and permitting a pull-in of the armature of K by only a portion of KW (i.e., therefore, higher wattage) and a holding or maintaining current through the entire winding KW at a much lower wattage value. Preferably, the armature of contactor K is of the overcentering or jack-knife type which insures good low resistance electrical contact being maintained across contacts KA and KB when closed by only a low-level holding current through KW.

In order to fully energize watt meter M, a conductor 29 of cable 11 is interconnected between terminal 3 of TB and meter terminal X, thereby energizing potential coil PG of meter M via leads CT1A and 29. The other two terminals 5 and 6 of TB are jumpered to terminals 4 and 3 which are directly connected to L1 (via CT1 and wire 13) and L2 (via a wire 33), respectively, thus bypassing contacts KA and KB of contactor K. Optionally connected to terminals 5 and 6 are two feeder conductors LLA and LLB. These conductors may be used to supply power to a waterpump system for the farmstead or any other such electrical load which it is normally desired to leave undisturbed but metered during periods which contactor K may be opened by control switch CBS for wiring modifications of a customer's branch or feeder circuits, etc.

Operation of the electric service system and service equipment of FIGS. 1 and 2 is as follows: Assuming electric power of proper voltage is supplied to service drop conductors L1, L2 and L3 from distribution transformer DT and lines PL of the utility's distribution system, the thermal delay cutout device T will be heated, and after a predetermined time (e.g., two to three minutes) contacts TC will close. The customer's service can then be energized by manual operation of control switch CBS mounted at a convenient height on the lower portion of the yard pole P. Momentary closure of contacts CBS completes the series circuit from L1 (via wires 13, CT1, CT1A, 15, 17, 19, potential relay contacts PA, the lower portion of contactor winding KW, wire 27, lower portion of contacts KC, thermal delay cutout switch TC contacts, wire 23) to L2. Completion of this circuit energizes the armature of contactor K to operate ganged contacts KA, KB, KC and KD. The former two sets of contacts provide power to LL1, LL2 and LL3, thereby energizing the customer's service. All current drawn by the customer's load is carried by the portions of L1 and L2 which pass through and constitute the primary winding of current transformer CT. The upper portion of contacts KC interconnect the entire winding KW for low wattage hold-in. Contacts KD are closed, thus shunting the TC contacts. Current transformer CT has its terminals electrically series-connected (by wires CT1, CT1A, 13, CT2A and CT2) with the current coils GH and EF of meter M and the overload current-responsive coil CBC of control breaker CB. These wires are inexpensive low-current capacity wires, such as AWG14. Meter M, which is preferably the meter already in use for a low-rated service, is energized by the low-level current flowing through this series circuit, which current is proportional to the total load current of L1, L2, assuming that the meter potential coil PG is energized by wires 29 and 33. Meter M, therefore, measures this low current value on an appropriate scale for meter M properly calibrated to the current transformer ratio so that it registers actual load current drawn from L1, L2.

In the event feeder conductors LL1, LL2 and LL3 need to be deenergized, CBS is manually operated to break the circuit to KW, which thereby opens contacts KA and KB. However, LLA and LLB are not deenergized and the electrical load it supplies is not interrupted although it continues to be metered. Reclosing of contacts KA and KB is simply accomplished by manual operation of CBS. If an overload or short occurs, the current flow through CBC increases to a level sufficient to automatically actuate CBS to an open position, thus causing KA and KB to open and drop the LL1, LL2, LL3 load. If the line voltage of L1, L2 drops to a low level, e.g., below 150 v., the contact PA will open, thus protecting the customer's load components from low line voltage. This is a particularly desirable feature, inasmuch as REA system primaries are frequently delta-connected and the secondaries Y-connected. Thus lightning, etc., may blow one of the primary fuses and power will continue to be supplied by the secondary, but at a considerably reduced potential.

Assuming there is an outage or failure in the utility's distribution system so that L1, L2 and L3 are deenergized, thermal delay cutout T begins to cool. If the outage is rectified and power is restored to L1, L2 and L3 in less than the predetermined delay period of T, contacts TC remain closed and contactor K is automatically immediately reenergized. Assuming the outage lasts for more than the predetermined delay period of T, say an outage of ten to twenty minutes, contacts TC will be opened and will not immediately reclose upon reenergization of L1, L2 and L3. Thus TC will reclose after such an extended outage only after a period of time necessary to bring T up to the temperature necessary to reclose contacts TC. The purpose of this is to prevent the cold load pick-up requirements from exceeding the diversity factor of the system of which PL is a part. If the outage is momentary or for only a few minutes, the many automatically cycling devices, such as compressors, air conditioners, freezers, pumps, etc., which operate on a random cycle, will not all be ready to start when power is restored. However, the longer the outage the more of these cycling devices will close their thermostats, and other control devices, so that they are prepared to start immediately upon power being resupplied. As the starting current of most A.C. motors will run five to six times the running current, the restoration of power on the distribution system after such an extended outage will require a cold load pick-up of perhaps ten to twelve times the line capacity. The integral service equipment of the present invention, however, prevents substantially exceeding the diversity factor after such a long outage, inasmuch as each customer's service will be picked up only after the delay entailed in reheating TE to close TC, this period for each customer's service being inherently somewhat different, thus staggering the reapplication of loads over the distribution system. If the outage is brief, only a few of the automatic cycling loads will be prepared to start and the diversity factor is not apt to be substantially exceeded to an extent which will cause another failure of the distribution system as the load is picked up.

When contacts TC reclose after an extended outage, there may be a tendency to chatter or at least make a poor initial contact. To avoid contactor K from being intermittently energized by TC under this condition, contacts KD are provided. Thus, the initial closing of TC, even though transitory, will immediately close KD and hold or maintain winding KW energized.

It will be understood that, although the embodiment shown depicts a single-phase system and meter, this invention is equally applicable and advantageous with a three-phase service, the only differences being the replacement of CT with a pair of current transformers and the use of a three-phase meter M. Similarly apparent to those skilled in the art is the equivalence of the many other types of meters, such as single element meters, with the dual element meter illustrated at M. Also, it will be noted that delay cutout devices, such as dash-pot and RC circuit types, may be utilized instead of thermally actuated ones such as illustrated at T. It will be further understood that there are instances in which the service drop may not be connected to the top of a pole such as P, but high up on a building or other structure, in which instance the present invention is equally applicable and advantageous, the meter M and control breaker CB simply being mounted on the building below cabinet C and at a convenient easy-to-reach height above floor or ground level.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. In an electric service system including service drop conductors adapted to supply power to service equipment mounted on a pole and feeder conductors adapted to supply power from said service equipment to various electric loads; said service equipment comprising a current transformer mounted near the top of the pole and adapted to sense the magnitude of current flowing in said service drop conductors, an electric meter positioned on said pole substantially below said current transformer and electrically connected therewith by electrical conductors, a contactor mounted adjacent said current transformer near the pole top and having at least two sets of contacts respectively serially connected between service drop conductors and feeder conductors, said contactor having an actuating winding adapted when energized to close said sets of contacts, a delay cutout device energized from and connected to said service drop conductors and having a set of contacts which will open only after a predetermined delay following failure of current supplied by said service drop conductors and will reclose after a delay upon reenergization of said service drop conductors, and a control switch mounted adjacent said meter, said control switch and the cutout contacts being serially connected in a circuit with said contactor winding whereby the contactor may be actuated to a closed or open position by operation of said control switch but said contactor cannot be reclosed immediately if power supplied to said drop conductors has been interrupted for more than the period of said predetermined delay.

2. In an electric service system as set forth in claim 1, said control switch being manually operable, said service equipment further including an overload current-responsive coil series-connected with said current transformer and adapted to actuate said control switch to an open position upon the load current drawn by said feeder conductors exceeding a preset level whereby said control switch is also automatically responsive to overload current.

3. In an electric service system as set forth in claim 1, said winding having an intermediate winding tap and an additional set of contacts interconnecting only a portion of the winding in said series circuit when the first said two sets of contactor contacts are open and interconnecting the entire contactor winding in said series circuit when first said two sets of contactor contacts are closed whereby the contactor requires a lesser amount of current to maintain said sets of contacts closed than is initially required to actuate them from an open to a closed position.

4. In an electric service system as set forth in claim 1, said delay cutout device including a thermal element connected across said service drop conductors and maintaining the contacts of said delay contact switch closed while said service drop conductors are electrically energized, said thermal element being manually adjustable to vary the period of said predetermined delay and being compensated for ambient temperature variations.

5. In an electric service system as set forth in claim 4, said contactor including an additional set of contacts shunt-connected across the contacts of said delay cutout device whereby an initial closing of said delay cutout will automatically actuate said contactor, and said additional set of contacts comprising a holding circuit adapted to maintain said contactor energized while said service drop conductors are energized.

6. In an electric service system as set forth in claim 1, an additional set of feeder conductors being interconnected directly to said service drop conductors whereby the load current drawn through said additional set of feeder conductors is not interruptable by said contactor but is metered.

7. In an electric service system as set forth in claim 1, said service equipment further including a potential relay having a winding connected across the service drop conductors and having a pair of contacts series-connected in said circuit with said control switch and cutout contacts, whereby the contactor contacts are opened upon the line voltage in said system dropping below a predetermined value.

References Cited by the Examiner
UNITED STATES PATENTS

| 1,722,741 | 7/29 | Getchell | 317—37 |
| 1,761,772 | 6/30 | Carpenter et al. | 317—37 |
| 2,590,083 | 3/52 | Atkinson et al. | 307—35 |
| 2,605,324 | 7/52 | Madden | 307—35 |
| 2,655,575 | 10/53 | Wallace et al. | 317—22 |

RALPH D. BLAKESLEE, *Acting Primary Examiner.*

ORIS L. RADER, LLOYD McCOLLUM, *Examiners.*